United States Patent
Rivellini et al.

(10) Patent No.: US 9,932,071 B1
(45) Date of Patent: Apr. 3, 2018

(54) ENERGY ABSORBING ASSEMBLY

(71) Applicants: Tommaso P. Rivellini, Sunnyvale, CA (US); Andrzej T. Baranski, Sunnyvale, CA (US); Jean Paul Montant, Sunnyvale, CA (US); Erik Mikael Fermer, Sunnyvale, CA (US)

(72) Inventors: Tommaso P. Rivellini, Sunnyvale, CA (US); Andrzej T. Baranski, Sunnyvale, CA (US); Jean Paul Montant, Sunnyvale, CA (US); Erik Mikael Fermer, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/488,991

(22) Filed: Apr. 17, 2017

Related U.S. Application Data

(60) Provisional application No. 62/332,709, filed on May 6, 2016.

(51) Int. Cl.
| | | |
|---|---|---|
| *B62D 21/15* | (2006.01) | |
| *B62D 21/02* | (2006.01) | |
| *B62D 25/08* | (2006.01) | |
| *B62D 29/04* | (2006.01) | |

(52) U.S. Cl.
CPC .......... *B62D 21/152* (2013.01); *B62D 21/02* (2013.01); *B62D 25/08* (2013.01); *B62D 29/041* (2013.01)

(58) Field of Classification Search
CPC ...... B62D 21/152; B62D 21/02; B62D 25/08; B62D 29/041
USPC ................ 293/132, 133; 296/187.09, 187.1
See application file for complete search history.

(56) References Cited

U.S. PATENT DOCUMENTS

| | | | |
|---|---|---|---|
| 3,831,997 A | 8/1974 | Myers | |
| 6,209,948 B1 | 4/2001 | Mori et al. | |
| 6,811,211 B2* | 11/2004 | Saito | B62D 25/2018 296/187.09 |
| 7,032,961 B2 | 4/2006 | Matsuda | |
| 7,226,121 B2 | 6/2007 | Dandekar et al. | |
| 8,336,934 B2* | 12/2012 | Kwon | B60R 19/24 293/133 |
| 2014/0062107 A1* | 3/2014 | Kim | B60R 19/34 293/133 |
| 2016/0068193 A1* | 3/2016 | Koike | B62D 25/082 296/187.09 |

* cited by examiner

*Primary Examiner* — Joseph D. Pape
(74) *Attorney, Agent, or Firm* — Young Basile Hanlon & MacFarlane, P.C.

(57) ABSTRACT

An energy absorbing assembly includes a beam that extends in a first direction, a structural member that extends in a second direction transverse to the beam, a load transfer structure that restrains motion of the beam relative to the structural member by transferring lateral loads between the beam and the structural member, and a recess defined in the structural member. The beam is connected to the structural member within the recess and extends out of the recess. The beam is configured to shorten during an impact to define a failed portion of the beam, and the beam is connected to the structural member such that the failed portion of the beam is at least partially receivable in the recess.

20 Claims, 7 Drawing Sheets

ENERGY ABSORBING ASSEMBLY

CROSS-REFERENCE TO RELATED APPLICATIONS

This application claims the benefit of U.S. Provisional Application No. 62/332,709, filed on May 6, 2016, which is incorporated herein by reference in its entirety.

TECHNICAL FIELD

The application relates generally to deformable energy absorbing structures for vehicles.

BACKGROUND

Vehicles such as automobiles that are intended for on-road use are designed to protect the occupants who are travelling in the vehicle. This function is performed in part by the body structure of the vehicle. The body structure may include, as examples, externally visible body panels, a frame, a chassis, a monocoque, a subframe, and/or other types of structures and combinations of such structures.

During an impact of the vehicle with respect to another vehicle or a fixed object, the body structure of the vehicle may be subjected to extreme forces that can cause deformation of the body structure. Certain portions of the body structure may be reinforced to resist deformation. This may be the case, for example, for portions of the vehicle's body structure that surround the passenger compartment of the vehicle. By reinforcing structures surrounding the passenger compartment, intrusion of body structures into the passenger compartment can be reduced. Other portions of a vehicle's body structure may be designed such that they are able to deform in a controlled manner. When these portions of the vehicle's body structure deform, part of the energy of the impact is absorbed by the deformation.

Many vehicle designs include a front beam structure that is designed to absorb energy from impacts involving the front end of the vehicle. The front beam structure is positioned forward of the passenger compartment, and typically includes one or more beams that extend in a longitudinal direction of the vehicle. Each of these beams is configured so that it deforms and shortens during an impact, such as by crushing. The amount of deformation (e.g. longitudinal shortening) that these beams experience during an impact is directly related to the amount of energy that the beams absorb. Thus, a longer beam is typically able to absorb more energy during an impact.

SUMMARY

One aspect of the disclosure is an energy absorbing assembly for a vehicle. The energy absorbing assembly includes a beam that extends in a first direction, a structural member that extends in a second direction transverse to the beam, a load transfer structure that restrains motion of the beam relative to the structural member by transferring lateral loads between the beam and the structural member, and a recess defined in the structural member. The beam is connected to the structural member within the recess and extends out of the recess. The beam is configured to shorten during an impact to define a failed portion of the beam, and the beam is connected to the structural member such that the failed portion of the beam is at least partially receivable in the recess.

In some implementations, the beam is connected to a first portion of the structural member at a first axial end of the beam.

In some implementations, the load transfer structure is connected to a second portion of the structural member restrains motion of the beam relative to the structural member at a location that is between the first axial end of the beam and a second axial end of the beam.

In some implementations, the load transfer structure includes a plate that is positioned at a front end of the recess. The plate may be rigidly connected to the second portion of the structural member such that the plate is engageable with the beam. The plate may be rigidly connected to the second portion of the structural member and rigidly connected to the beam. The plate may be configured to fail during an impact to allow motion of the beam relative to the second portion of the structural member.

In some implementations, the load transfer structure includes a frangible connection that is configured to fail during an impact to allow motion of the beam relative to the second portion of the structural member.

In some implementations, the recess is defined by a first recess side wall that extends into the recess from the second portion of the structural member and a second recess side wall that extends into the recess from the second portion of the structural member. The frangible connection extends from the beam to the first recess side wall and from the beam to the second recess side wall.

In some implementations, the energy absorbing assembly also includes a sensor that is configured to sense an impact, and the load transfer structure includes a coupler that connects a second portion of the structural member to the beam to restrain motion of the beam relative to the second portion of the structural member. The coupler moves from a connected position to a disconnected position in response to receiving a signal from the sensor indicating the impact has occurred.

Another aspect of the disclosure is a vehicle that includes a passenger compartment. The vehicle includes a structural wall that extends in a transverse direction and is positioned forward from the passenger compartment, a transverse structural beam that extends in the transverse direction and is connected to the structural wall, and a recess that is formed in the transverse structural beam. The recess defines an opening, has a rear recess wall, and has side recess walls that extend from the rear recess walls to the opening. A longitudinal beam extends in a longitudinal direction, has a first axial end that is located in the recess and is connected to the transverse structural beam at the rear recess wall, and has a second axial end that is located outside of the recess. A load transfer structure is located at the opening of the recess and restrains motion of the longitudinal beam relative to the transverse structural beam by transferring lateral loads between the longitudinal beam and the transverse structural beam.

Another aspect of the disclosure is an energy absorbing assembly for a vehicle. The energy absorbing assembly includes a beam that is formed from a composite material, has a first axial end, and has a second axial end. A structural member extends transverse to the beam. A load transfer structure restrains motion of the beam relative to the structural member by transferring lateral loads between the beam and the structural member. A recess is defined in the structural member. The beam is connected to the structural member within the recess. A collar extends into the second axial end of the beam. Movement of the collar toward the second axial end during an impact causes failure of the beam by tearing and outward splaying of the composite material.

DETAILED DESCRIPTION

The following disclosure relates generally to a vehicle structure that is able to absorb energy during an impact.

The need to absorb energy from head-on impacts has led many vehicle designs to adopt a deformable beam structure. The beam extends longitudinally, and is positioned between the passenger compartment of the vehicle and the front end of the vehicle. For example, the beam may extend longitudinally from the firewall of the vehicle longitudinally forward toward the front bumper of the vehicle. However, the required length of the beam places a constraint on the overall design of the vehicle, because the length of the beam must be sufficient to absorb a certain amount of energy.

The minimum front end length of a vehicle is typically controlled by three factors. The first factor, referred to as stroke, refers to the length of longitudinal shortening that is required of a deformable energy absorbing structure to achieve certain deceleration G loads during an impact. The second factor, referred to as stroke efficiency, is the ratio of the length of the deformable energy absorbing structure before full compression compared to its length after full compression, including the length of non-deformable portions of the structure. The third factor is the depth of a backup structure that is positioned between the deformable energy absorbing structure and a point inside the passenger compartment of the vehicle, such as an assumed location of the foot of the driver.

The structures described herein reduce the minimum overall length required for the front end of a vehicle by configuring a longitudinal beam and a structural member such that at least a portion of the compressed (crushed) length of the beam is nested inside the structural thickness of the structural member during an impact.

Figure 1:
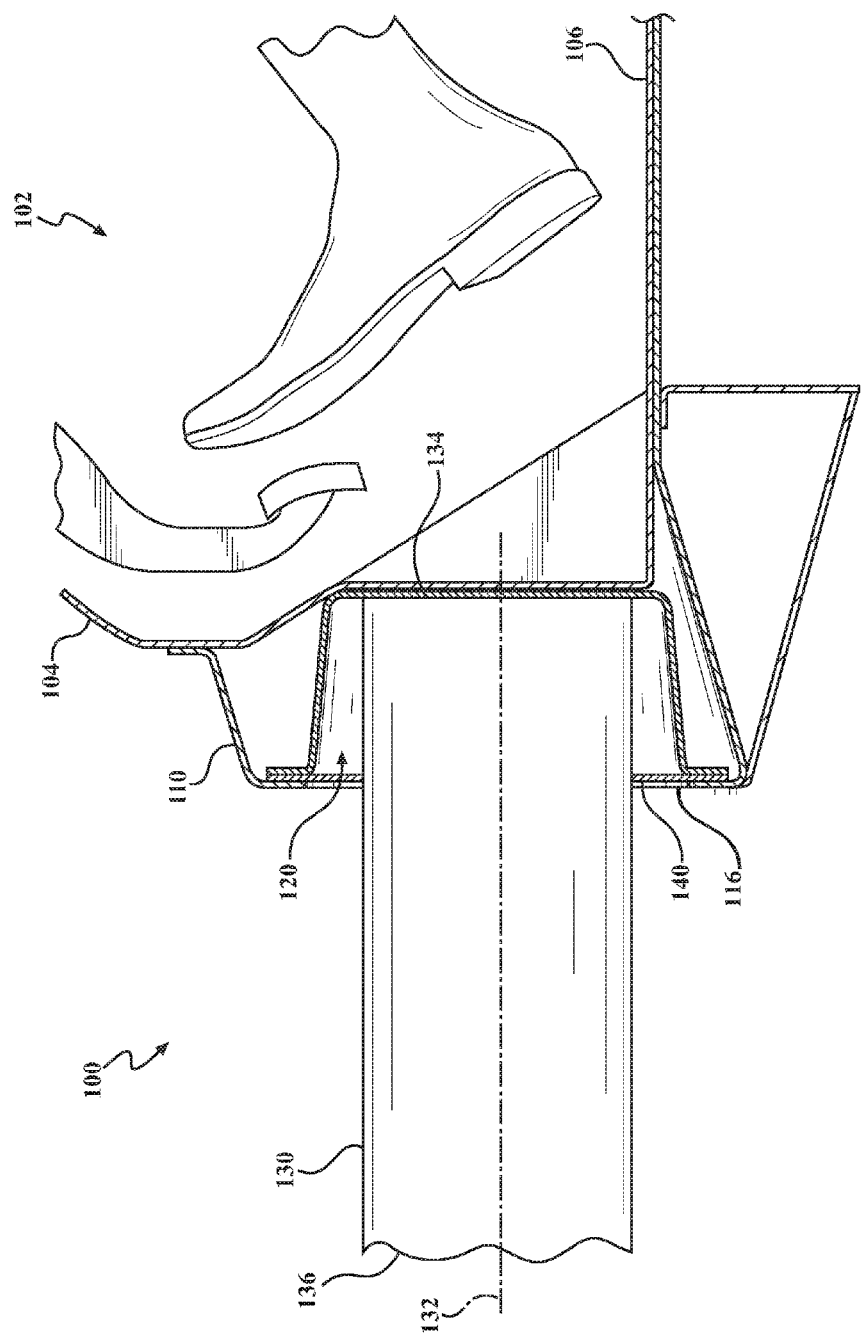
FIG. 1 is a side cross-section view showing a portion of a vehicle including an energy absorbing assembly according to a first example in a pre-impact condition.
Figure 2:
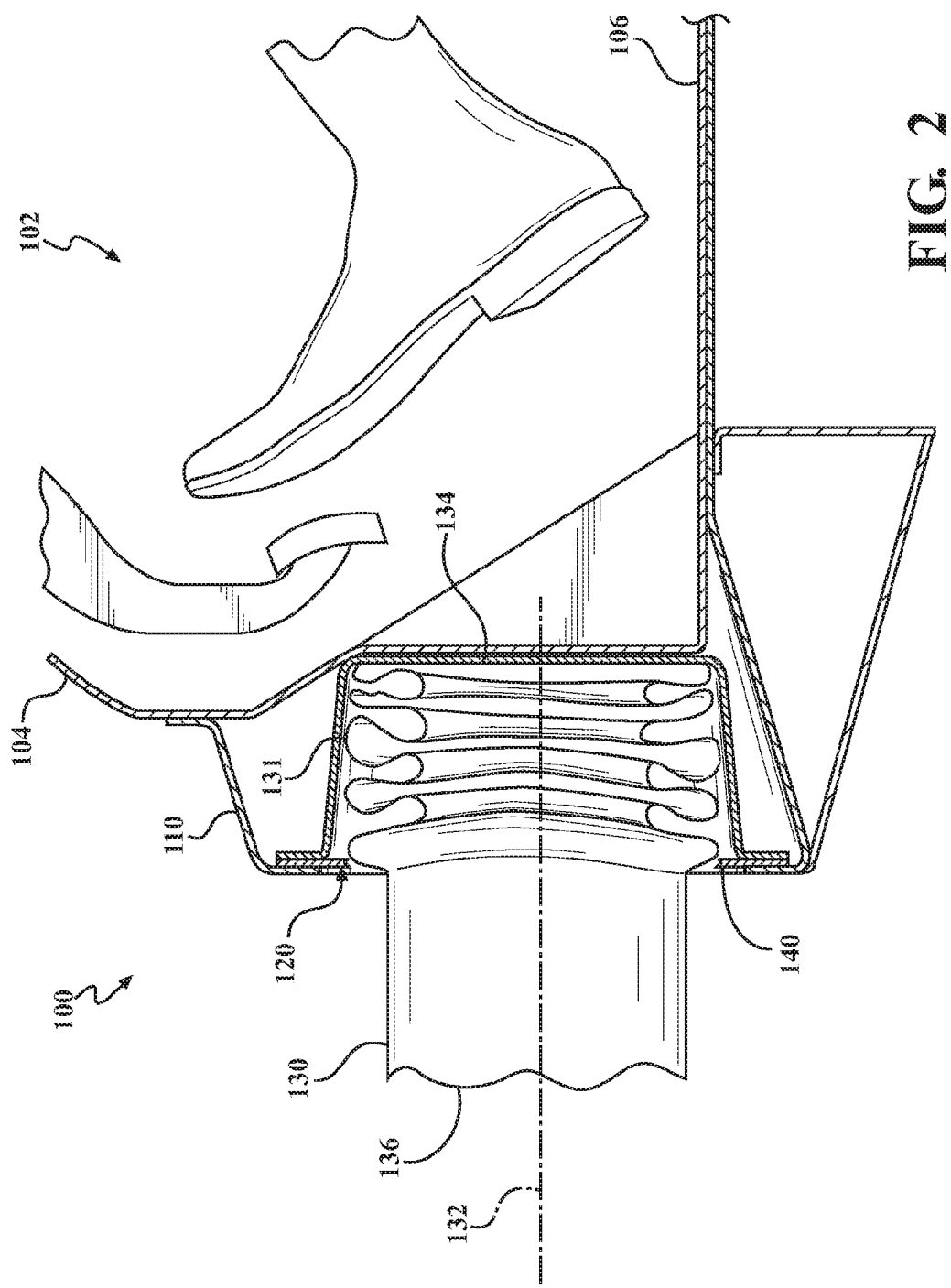
FIG. 2 is a side cross-section view showing the portion of the vehicle with the energy absorbing assembly according to the first example in a post-impact condition.

FIGS. 1-2 show a portion of a vehicle 100. The vehicle 100 may be of any type, such as an automobile that includes wheels that are driven by motive force provided by, as examples, an internal combustion engine or an electric motor. In the illustrated example, the vehicle includes a passenger compartment 102, a structural wall 104, a floor 106, a transverse structural beam 110, a recess 120 that is formed in the transverse structural beam 110, and a longitudinal beam 130. The vehicle 100 may also include a load transfer structure 140.

The vehicle 100 extends in a longitudinal direction from a front end (not shown) to a rear end (not shown). As used herein, the terms front or forward refer to locations or directions at or toward the front end of the vehicle 100, and the terms rear or rearward refer to locations at or toward the rear end of the vehicle 100. The term transverse refers to directions and orientations that lie in planes that intersect the longitudinal direction and may include directions and orientations that lie in planes that are perpendicular to or are generally perpendicular to the longitudinal direction. As used herein, a transverse direction refers to a side to side direction of the vehicle and indicates a direction that is transverse to the longitudinal direction may be closer to horizontal than to vertical. As used herein a top to bottom direction indicates a direction that is transverse to the longitudinal direction and may be closer to vertical than to horizontal. The longitudinal direction may also be referred to as a first direction, and the transverse direction may also be referred to as a second direction.

The passenger compartment 102 is a space internal to the vehicle 100 for carrying occupants that are riding in the vehicle 100. The passenger compartment 102 is defined by vehicle structures that are adjacent to it. As examples, the passenger compartment 102 may be defined in part by the floor 106, which is disposed below the passenger compartment 102. The passenger compartment 102 may be further defined by the structural wall 104, which extends in the transverse direction and is positioned forward from the passenger compartment 102.

The transverse structural beam 110 is configured to increase the rigidity and the load carrying capacity of the structure of the vehicle 100 in the area of the structural wall 104. The transverse structural beam 110 is connected to the structural wall 104 and may define part of the structural wall 104. The transverse structural beam 110 and the structural wall 104 serve as a backup structure for the longitudinal beam 130. The transverse structural beam 110 extends in the side-to-side direction of the vehicle 100, and may extend in a direction that is generally perpendicular to the longitudinal direction.

The transverse structural beam 110 may include interconnected walls and portions that defined internal voids, such as a hollow box-beam type configuration. The transverse structural beam 110 may be formed with a number of geometric configurations, such as with a cross section that is rectangular, square, triangular, oval circular, irregular, or combinations of such configurations, and is not limited to any particular geometric configuration. The transverse structural beam 110 may be formed from any suitable material. As examples, the transverse structural beam 110 may be formed from a metallic material such as aluminum or steel, or from a composite material, such as carbon fiber reinforced plastic.

The recess 120 is formed in the transverse structural beam 110. The recess 120 may be defined by components that are connected to the transverse structural beam 110, or the recess 120 may be defined by components that are formed as an integral part of the transverse structural beam 110. Although the recess 120 is shown as a single recess, it should be understood that multiple recesses may be formed in the transverse structural beam, with each of the multiple recesses corresponding to a respective longitudinal beam, which may be provided in equal numbers as compared to the recesses 120. For example, the vehicle 100 may include two of the longitudinal beams 130 that are spaced laterally from one another and two of the recesses 120 that are likewise spaced laterally from one another.

The vehicle 100 includes an energy absorbing deformable structure, which in the illustrated example is the longitudinal beam 130. The longitudinal beam 130 may also be referred to as a beam, a crushable beam, a longitudinal rail, or a front longitudinal rail. As used herein, the term "beam" refers to an elongate structural member but is not limited to a particular material or cross-sectional configuration.

The longitudinal beam 130 is connected to the transverse structural beam 110 and extends in the longitudinal direction along a beam longitudinal axis 132 between a first axial end 134 of the longitudinal beam 130 and a second axial end 136 of the longitudinal beam 130. The longitudinal beam 130 may extend in a direction that is generally aligned with the longitudinal direction of the vehicle 100, or the longitudinal beam 130 may extend in a direction that is exactly aligned with the longitudinal direction of the vehicle 100, subject to typical manufacturing tolerances. Thus, the transverse structural beam 110 extends transverse to the longitudinal beam 130. At least part of the longitudinal beam 130 is disposed in the recess 120, such that the first axial end 134 of the longitudinal beam 130 is connected to the transverse structural beam 110 within the recess 120 and the longitudinal beam 130 extends out of the recess 120.

The longitudinal beam 130 is configured to shorten in its axial direction when subjected to forces that act, at least in part, along the beam longitudinal axis 132, such as when the vehicle 100 is involved in an impact. Axial shortening allows the longitudinal beam 130 to absorb energy during an impact. Any material or design that allows axial crushing in an impact may be used for the longitudinal beam 130. As one example, the longitudinal beam 130 may be made of a metallic material, such as aluminum or steel, that is able to crush or fold axially during an impact. As another example, the longitudinal beam 130 may be made of a composite material that shortens axially during an impact as a result of a structural failure that causes the beam to tear and splay outward. In implementations where the longitudinal beam 130 is formed from a metallic material, an initiator feature (not shown), such as an indentation, may be formed on the longitudinal beam 130 to control where crushing begins and in what direction it propagates.

The longitudinal beam 130 is configured to shorten during an impact to define a failed portion 131, and the longitudinal beam 130 is connected to the transverse structural beam 110 such that the failed portion 131 of the longitudinal beam 130 is at least partially receivable in the recess 120. Thus, the longitudinal beam 130 has a pre-impact condition (FIG. 1) and a post-impact condition (FIG. 2). In the pre-impact condition, the longitudinal beam 130 has a maximum length, or stroke. In the post-impact condition, the longitudinal beam 130 is crushed to a shortened length, and at least part of the failed portion 131 of the longitudinal beam 130 is disposed within the recess 120, and therefore is nested within the structural depth of the transverse structural beam 110. The reduction in length of the longitudinal beam 130 as compared to its maximum pre-impact length is referred to as the stroke efficiency of the longitudinal beam 130. Since at least part of the failed portion 131 of the longitudinal beam 130 is nested within the recess 120 in the post-impact condition, it occupies a longitudinal length of the vehicle that is not typically crushed during an impact, which increases the overall space efficiency of the energy absorbing assembly.

The transverse structural beam 110 and the recess 120 are an example of a configuration that is able to nest the compressed length of all or part of the longitudinal beam 130 within the envelope used by structural members that are not being used to absorb energy during an impact. This configuration can be replicated at other locations along the longitudinal length of the longitudinal beam 130 by a fixed connection between of an intermediate location on the longitudinal beam 130 within a recess of a structural member. This allows nesting of the compressed length of the longitudinal beam 130 to be accomplished at multiple locations along the length of the longitudinal beam 130.

Figure 3:
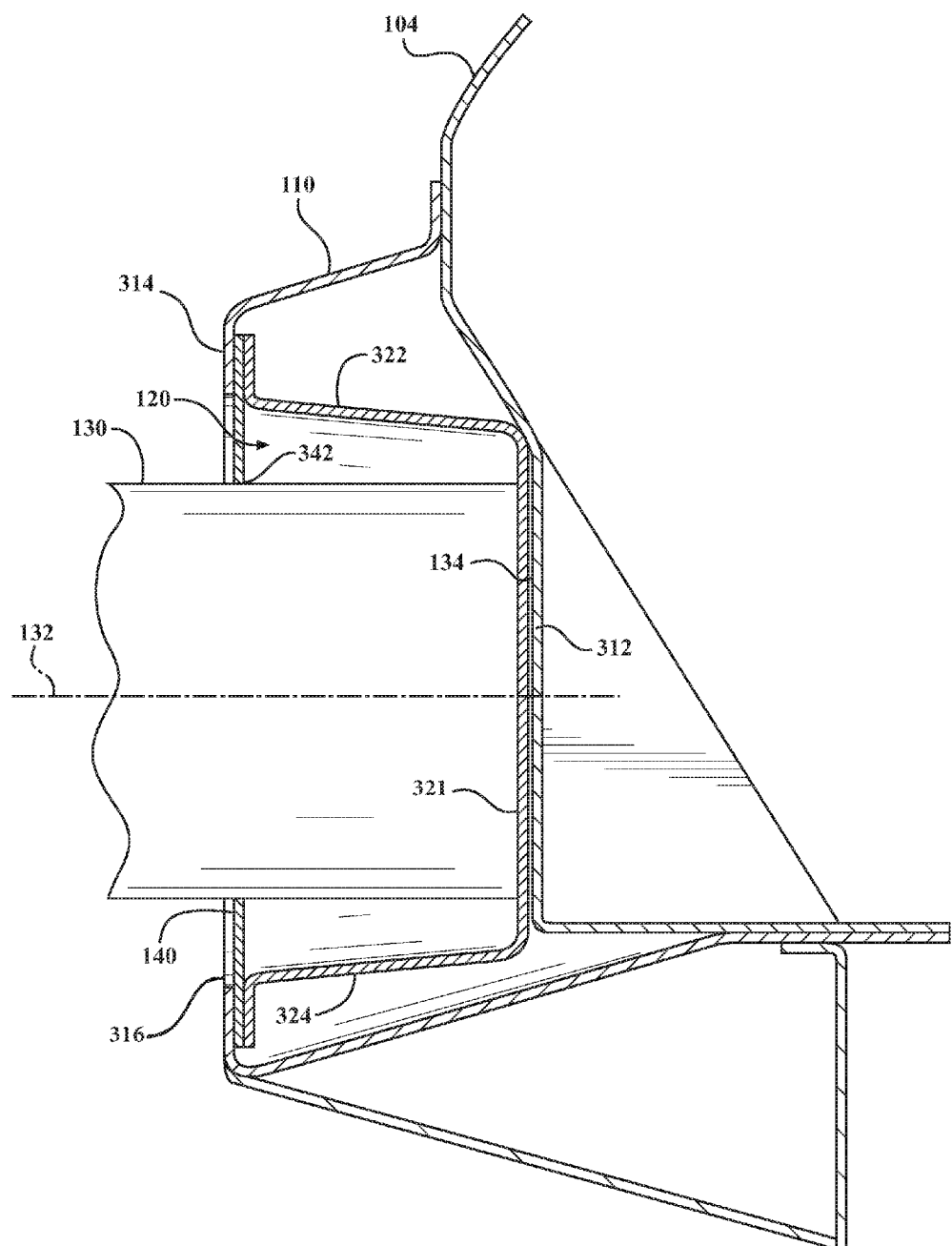
FIG. 3 is a side cross-section view showing a transverse structural beam and a longitudinal beam of the energy absorbing assembly according to the first example.
Figure 4:
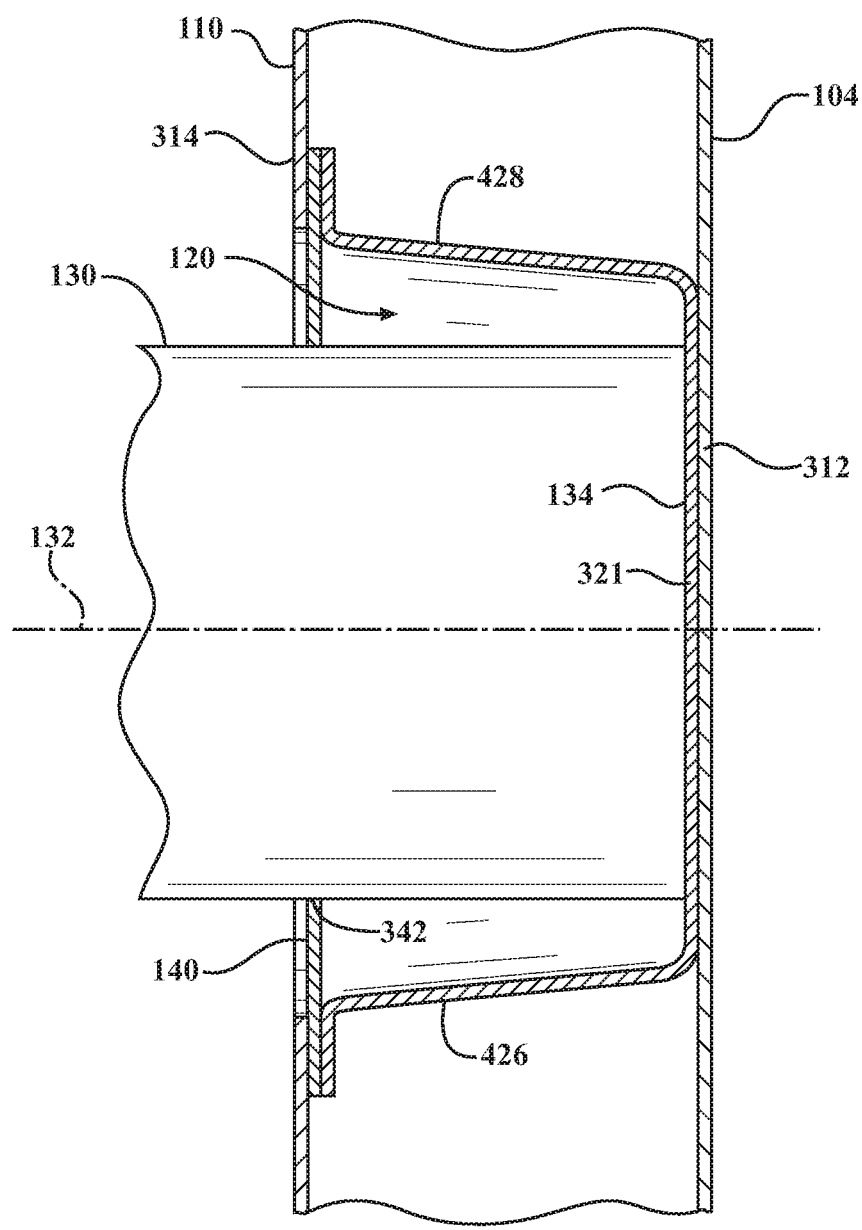
FIG. 4 is a top cross-section view showing the transverse structural beam and the longitudinal beam of the energy absorbing assembly according to the first example.

As best seen in FIGS. 3-4, the transverse structural beam 110 includes a rear portion 312, which may also be referred to herein as a first portion of the transverse structural beam 110. In some implementations, the longitudinal beam 130 is connected to the rear portion 312 of the structural beam 100 at the first axial end 134 of the longitudinal beam 130. In the illustrated example, the rear portion 312 of the transverse structural beam 110 is defined by a portion of the structural wall 104. In other implementations, the rear portion 312 of the transverse structural beam 110 may be separate from the structural wall 104. The transverse structural beam 110 also includes a front portion 314, which may also be referred to herein as a second portion of the transverse structural beam 110. The front portion 314 of the transverse structural beam 110 is positioned longitudinally forward from the rear portion 312 of the transverse structural beam 110.

The rear portion 312 and the front portion 314 of the transverse structural beam 110 may each be a wall or other part of the transverse structural beam 110. As in the illustrated example, the rear portion 312 and the front portion 314 may each extend in the transverse direction of the vehicle 100. The rear portion 312 and the front portion 314 are spaced apart from each other in the longitudinal direction of the vehicle 100.

The recess 120 extends from the rear portion 312 of the transverse structural beam 110 to the front portion 314 of the transverse structural beam 110. The recess 120 is substantially hollow in in the longitudinal direction. Transversely outward from the longitudinal center of the recess 120, the recess 120 may be defined by portions of the transverse structural beam 110 that surround and thereby define the recess 120. In the illustrated example, as best seen in FIG. 3, the portions of the transverse structural beam 110 that surround and define the recess 120 may include a rear recess wall 321, an upper recess wall 322, and a lower recess wall 324. As best seen in FIG. 4, the portions of the transverse structural beam 110 that surround and define the recess 120 may further include a first side recess wall 426, and a second side recess wall 428.

The upper recess wall 322, the lower recess wall 324, the first side recess wall 426, and the second side recess wall 428 each extend rearward into the recess 120 from an opening 316 that is defined in the front portion 314 of the of the transverse structural beam 110. The upper recess wall 322, the lower recess wall 324, the first side recess wall 426, and the second side recess wall 428 each extend rearward from a front end of the recess 120 to the rear recess wall 321, which is positioned at a rear end of the recess 120. Together, the upper recess wall 322, the lower recess wall 324, the first side recess wall 426, and the second side recess wall 428 define a peripheral wall for the recess 120.

The load transfer structure 140 transfers lateral loads between the longitudinal beam 130 and the transverse structural beam 110 such that the transverse structural beam 110 restrains lateral motion of the longitudinal beam 130. The load transfer structure 140 is connected to or in engagement with the longitudinal beam 130 at a location that is between the first axial end 134 and the second axial end 136 of the longitudinal beam 130. Thus, in some implementations, the front portion 314 of the transverse structural beam 110 restrain motion of the longitudinal beam 130 relative to the transverse structural beam 110 at a location that is between the first axial end 134 of the longitudinal beam 130 and a second axial end 136 of the longitudinal beam 130. The load transfer structure 140 may connect the longitudinal beam 130 to the front portion 314 of the transverse structural beam 110 at a periphery of the opening 116 that is formed through the front portion 314 of the transverse structural beam 110 at the recess 120.

The load transfer structure 140 may be fixed to the transverse structural beam 110. In some implementations, the load transfer structure 140 is fixed to the longitudinal beam 130 such as by fasteners or welding, and resists axial motion of the longitudinal beam 130 with respect to the transverse structural beam 110. In such an implementation, the load transfer structure 140 may be frangible so that it fails during an impact to allow crushing of the longitudinal beam 130. In other implementations, the load transfer structure 140 is not fixed to the longitudinal beam 130 and allows relative axial motion while transferring lateral forces by engagement of the load transfer structure 140 with respect to the longitudinal beam 130, such as by a slip joint. In the illustrated example, the load transfer structure 140 is a plate that is either fixed to the longitudinal beam 130 at an inner periphery 342 where the longitudinal beam 130 extends through the load transfer structure 140, or is in engagement with the longitudinal beam 130 at the inner periphery 342.

Figure 5:
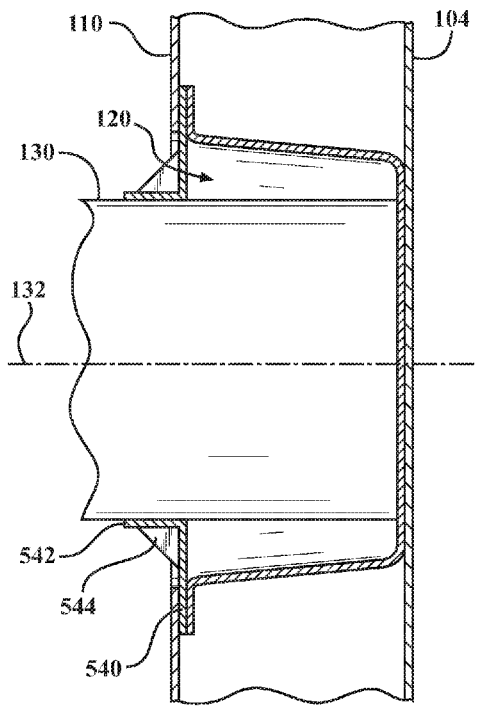
FIG. 5 is a side cross-section showing an energy absorbing assembly according to a second example.

FIG. 5 shows an energy absorbing assembly that is similar to the energy absorbing assembly shown in FIGS. 1-4 except as described herein. In this implementation, a load transfer structure includes a plate 540 that extends toward the longitudinal beam 130 from the front portion 314 of the transverse structural beam 110. A collar 542 is connected to the plate 540 and surrounds the longitudinal beam 130, such that the collar 542 engages the longitudinal beam 130. The collar 542 extends forward in the longitudinal direction, away from the recess 120. The collar 542 extends at an angle with respect to the plate 540, and may extend perpendicular to the plate 540. The length of the collar 542 may be selected to provide a desired amount of lateral load transfer capacity. Stiffening ribs 544 may optionally be provided and extend from the plate 540 to the collar 542 in an array around the collar 542.

Figure 6:
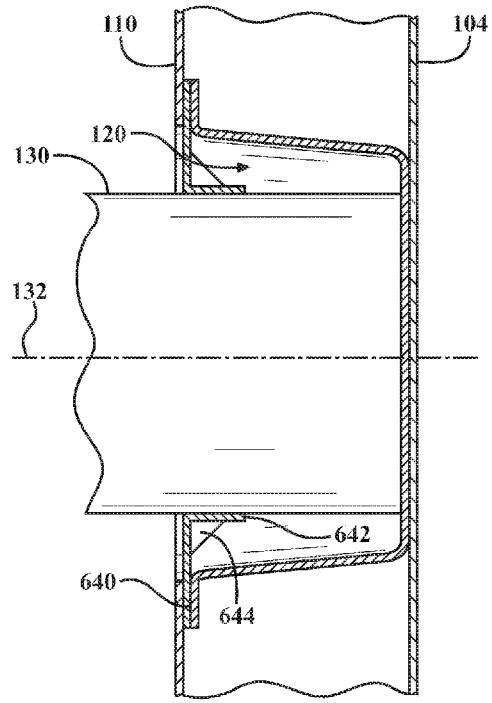
FIG. 6 is a side cross-section showing an energy absorbing assembly according to a third example.

FIG. 6 shows an energy absorbing assembly that is similar to the energy absorbing assembly shown in FIGS. 1-4 except as described herein. In this implementation, a load transfer structure includes a plate 640 that extends toward the longitudinal beam 130 from the front portion 314 of the transverse structural beam 110. A collar 642 is connected to the plate 640 and surrounds the longitudinal beam 130, such that the collar 642 engages the longitudinal beam 130. The collar 642 extends rearward in the longitudinal direction, into the recess 120. The collar 642 extends at an angle with respect to the plate 640, and may extend perpendicular to the plate 640. The length of the collar 642 may be selected to provide a desired amount of lateral load transfer capacity. Stiffening ribs 644 may optionally be provided and extend from the plate 640 to the collar 642 in an array around the collar 642.

Figure 7:
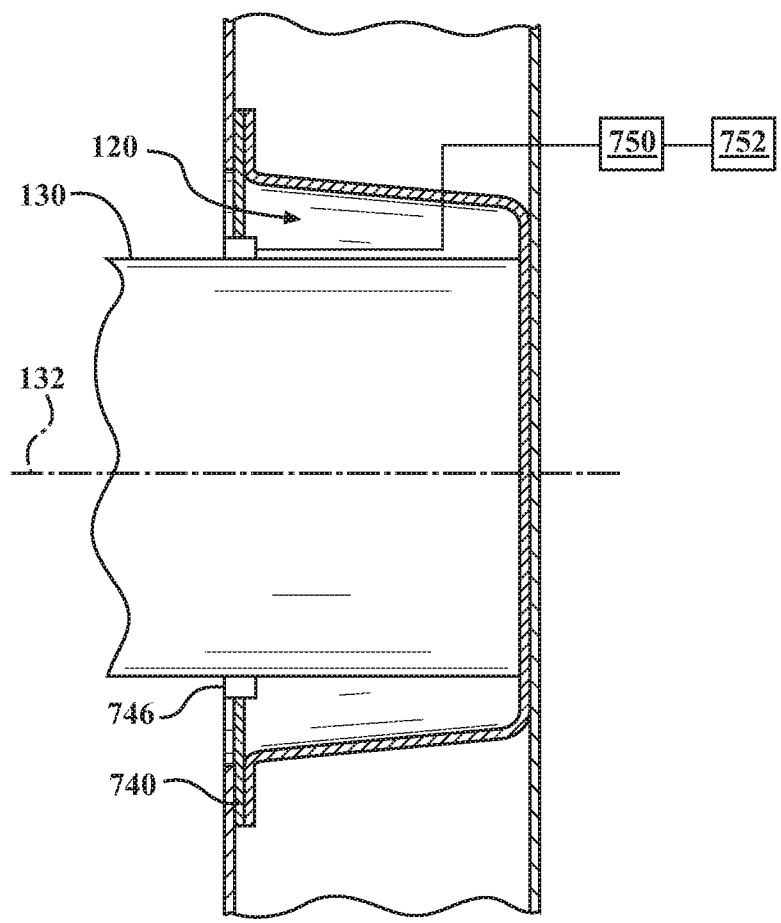
FIG. 7 is a side cross-section showing an energy absorbing assembly according to a fourth example.

FIG. 7 shows an energy absorbing assembly that is similar to the energy absorbing assembly shown in FIGS. 1-4 except as described herein. In this implementation, a load transfer structure includes a plate 740 that extends toward the longitudinal beam 130 from the front portion 314 of the transverse structural beam 110. The plate 740 is connected to the longitudinal beam 130 by a coupler 746. The coupler 746 connects the front portion 314 of the transverse structural beam 110 to the longitudinal beam 130 through the plate 740 to restrain motion of the longitudinal beam 130 relative to the front portion 314 of the transverse structural beam 110. The coupler 746 moves from a connected position to a disconnected position in response to receiving a signal that activates the coupler to cause decoupling of the plate 740 from the longitudinal beam 130. As an example, the signal may be received at the coupler 746 from a controller 750 that is electrically connected to the coupler 746. The controller 750 may include a processor and a memory that stores instructions. When the instructions are executed, the controller 750 monitors signals from a sensor 752. Upon determining that the signals from the sensor 752 are indicative of an impact, the instructions cause the controller 750 to transmit the signal to the coupler 746 and thereby move the coupler 746 from the connected position to the disconnected position. As one example, the coupler 746 may be a mechanical coupling device that disconnects by releasing mechanical engagement. As another example, the coupler 746 may be a pyrotechnic device that disconnects by explosively causing failure of the connection of the plate 740 with respect to the longitudinal beam 130.

Figure 8:
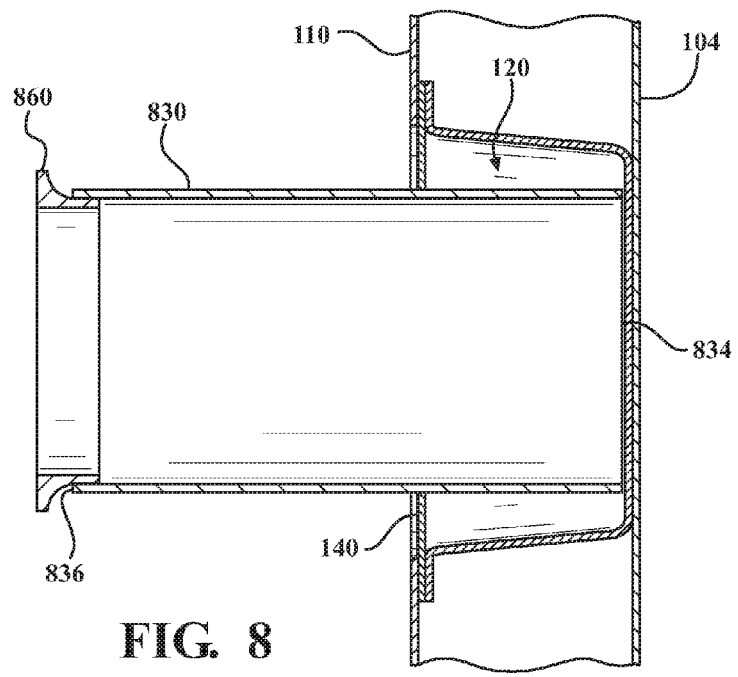
FIG. 8 is a side cross-section showing an energy absorbing assembly according to a fifth example in a pre-impact condition.
Figure 9:
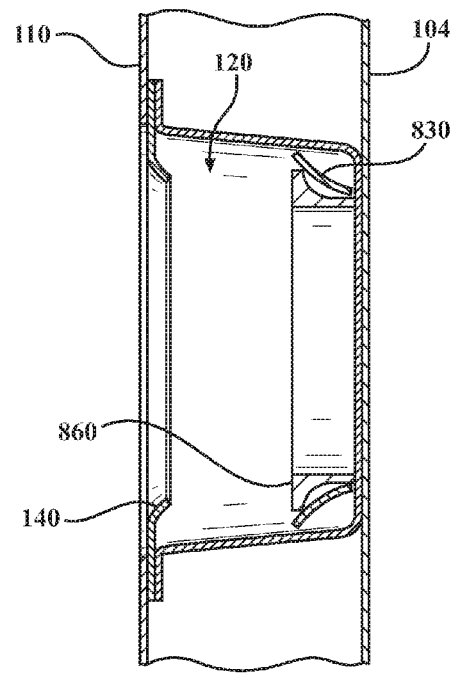
FIG. 9 is a side cross-section showing an energy absorbing assembly according to a fifth example in a post-impact condition.

FIGS. 8-9 show an energy absorbing assembly that is similar to the energy absorbing assembly shown in FIGS. 1-4 except as described herein. In this implementation, a longitudinal beam 830 is formed from a composite material. A first axial end 834 of the longitudinal beam 830 is positioned in the recess 120, and a collar 860 is seated on and extends into a second axial end 836 of the longitudinal beam 830 in a pre-impact position (FIG. 8). During an impact, the collar 860 is moved axially toward the first axial end 834 of the longitudinal beam 830 by impact forces. During this movement, the collar 860 causes failure of the longitudinal beam 830, by causing tearing and outward splaying of the composite material. In a post-impact position (FIG. 9), the collar 860 is nested within the recess 120, which enhances the space efficiency of the energy absorbing assembly.

What is claimed is:

1. An energy absorbing assembly for a vehicle, comprising:
   a beam that extends in a first direction;
   a structural member that extends in a second direction transverse to the beam, the structural member having a first portion and a second portion;
   a load transfer structure that restrains motion of the beam relative to the structural member by transferring lateral loads between the beam and the structural member; and
   a recess defined in the structural member by an opening formed in the second portion of the structural member and a peripheral recess wall that extends from the opening toward the first portion of the structural member, wherein the beam is connected to the structural member within the recess, the beam extends out of the recess, the beam is configured to shorten during an impact to define a failed portion of the beam, and the beam is connected to the structural member such that the failed portion of the beam is at least partially receivable in the recess.

2. The energy absorbing assembly of claim 1, wherein the beam is connected to the first portion of the structural member at a first axial end of the beam.

3. The energy absorbing assembly of claim 2, wherein the load transfer structure is connected to the second portion of the structural member at a location that is between the first axial end of the beam and a second axial end of the beam.

4. The energy absorbing assembly of claim 3, wherein the load transfer structure includes a plate that is positioned at a front end of the recess.

5. The energy absorbing assembly of claim 4, wherein the plate is rigidly connected to the second portion of the structural member and is engageable with the beam.

6. The energy absorbing assembly of claim 4, wherein the plate is rigidly connected to the second portion of the structural member and is rigidly connected to the beam.

7. The energy absorbing assembly of claim 6, wherein the plate is configured to fail during an impact to allow motion of the beam relative to the second portion of the structural member.

8. The energy absorbing assembly of claim 3, wherein the load transfer structure includes a frangible portion through which load is transferred between the beam and the second portion of the structural member that is configured to fail during an impact to allow motion of the beam relative to the second portion of the structural member.

9. The energy absorbing assembly of claim 8, wherein the peripheral wall of the recess is formed by a first recess side wall that extends into the recess from the second portion of the structural member and a second recess side wall that extends into the recess from the second portion of the structural member, and the frangible connection extends from the beam to the first recess side wall and from the beam to the second recess side wall.

10. An energy absorbing assembly for a vehicle, comprising:
   a beam that extends in a first direction;
   a structural member that extends in a second direction transverse to the beam;
   a load transfer structure that restrains motion of the beam relative to the structural member by transferring lateral loads between the beam and the structural member;
   a recess defined in the structural member, wherein the beam is connected to the structural member within the recess, the beam extends out of the recess, the beam is configured to shorten during an impact to define a failed portion of the beam, and the beam is connected to the structural member such that the failed portion of the beam is at least partially receivable in the recess; and
   a sensor that is configured to sense an impact, wherein the load transfer structure includes a coupler that connects a second portion of the structural member to the beam to restrain motion of the beam relative to the second portion of the structural member, and the coupler moves from a connected position to a disconnected position in response to receiving a signal from the sensor indicating the impact has occurred.

11. A vehicle that includes a passenger compartment, comprising:
   a structural wall that extends in a transverse direction and is positioned forward from the passenger compartment;
   a transverse structural beam that extends in the transverse direction and is connected to the structural wall;
   a recess that is formed in the transverse structural beam, defines an opening, has a rear recess wall, and has side recess walls that extend from the rear recess walls to the opening;
   a longitudinal beam that extends in a longitudinal direction, has a first axial end that is located in the recess and is connected to the transverse structural beam at the rear recess wall, and has a second axial end that is located outside of the recess; and
   a load transfer structure that is located at the opening of the recess and restrains motion of the longitudinal beam relative to the transverse structural beam by transferring lateral loads between the longitudinal beam and the transverse structural beam.

12. The vehicle of claim 11, wherein the longitudinal beam is spaced from the side recess walls.

13. The vehicle of claim 11, wherein the longitudinal beam is configured to shorten during an impact to define a failed portion of the longitudinal beam, and the failed portion of the longitudinal beam is at least partially receivable in the recess.

14. The vehicle of claim 11, wherein the load transfer structure is connected to the transverse structural beam and engages the longitudinal beam at a location between the first axial end of the longitudinal beam and the second axial end of the longitudinal beam.

15. The vehicle of claim 11, wherein the load transfer structure is connected to the transverse structural beam and is connected to the longitudinal beam at a location between the first axial end of the longitudinal beam and the second axial end of the longitudinal beam.

16. The vehicle of claim 15, wherein the load transfer structure is configured to fail during an impact to allow axial motion of the longitudinal beam relative to transverse structural beam.

17. The vehicle of claim 16, further comprising:
   a sensor that is configured to sense an impact, wherein the load transfer structure includes a coupler that connects the transverse structural beam to the longitudinal beam to restrain motion of the longitudinal beam relative to the transverse structural beam, and the coupler moves from a connected position to a disconnected position in response to receiving a signal from the sensor indicating the impact has occurred.

18. An energy absorbing assembly for a vehicle, comprising:
   a beam that is formed from a composite material, has a first axial end, and has a second axial end;
   a structural member that extends transverse to the beam;
   a load transfer structure that restrains motion of the beam relative to the structural member by transferring lateral loads between the beam and the structural member;
   a recess defined in the structural member, wherein the beam is connected to the structural member within the recess; and
   a collar that extends into the second axial end of the beam, wherein movement of the collar toward the second axial end during an impact causes failure of the beam by tearing and outward splaying of the composite material.

19. The energy absorbing assembly of claim 18, wherein the beam is connected to a first portion of the structural member at a first axial end of the beam.

20. The energy absorbing assembly of claim 18, wherein the load transfer structure is connected to a second portion of the structural member at a location that is between the first axial end of the beam and a second axial end of the beam.

\* \* \* \* \*